US008057780B2

(12) United States Patent
Jang et al.

(10) Patent No.: US 8,057,780 B2
(45) Date of Patent: Nov. 15, 2011

(54) METHOD FOR PREPARING NANOPARTICLES USING CARBENE DERIVATIVES

(75) Inventors: Eun Joo Jang, Suwon-si (KR); Seung Uk Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 486 days.

(21) Appl. No.: 12/329,058

(22) Filed: Dec. 5, 2008

(65) Prior Publication Data

US 2009/0289233 A1 Nov. 26, 2009

(30) Foreign Application Priority Data

May 20, 2008 (KR) ........................ 10-2008-0046735

(51) Int. Cl.
*C01B 19/00* (2006.01)
(52) U.S. Cl. .................. 423/508; 423/511; 423/594.14; 423/618; 252/500; 252/518.1; 252/519.14; 252/519.4; 252/519.5; 252/520.2; 252/520.5; 75/330; 75/362; 75/369; 548/103; 977/840; 977/895
(58) Field of Classification Search ............... 423/508, 423/511, 594.14, 618; 252/500, 518.1, 519.14, 252/519.5, 520.2, 520.5; 75/330, 362, 369; 548/103; 977/840, 895
See application file for complete search history.

(56) References Cited

U.S. PATENT DOCUMENTS

| 6,086,779 | A | * | 7/2000 | Bishop et al. | .................... 216/93 |
| 7,115,688 | B1 | * | 10/2006 | Mirkin et al. | .................. 526/127 |
| 7,273,509 | B1 | * | 9/2007 | Keller et al. | ..................... 75/362 |
| 2006/0100365 | A1 | | 5/2006 | Tam et al. | |
| 2006/0239882 | A1 | * | 10/2006 | Seo et al. | ........................ 423/263 |
| 2006/0258043 | A1 | | 11/2006 | Bold et al. | |
| 2007/0252311 | A1 | | 11/2007 | Tam et al. | |
| 2008/0018221 | A1 | | 1/2008 | Egen et al. | |
| 2008/0245186 | A1 | * | 10/2008 | Yang et al. | ...................... 75/362 |
| 2010/0130763 | A1 | * | 5/2010 | Gao | ............................... 554/167 |

FOREIGN PATENT DOCUMENTS

JP 2007084635 4/2007

OTHER PUBLICATIONS

Chen et al. ("Carbene-Functionalized Ruthenium Nanoparticles." Chem. Mater. vol. 18, p. 5253-5259, Oct. 5, 2006).*
Chen et al. ("Nanoparticle-Mediated Intervalence Transfer." JACS vol. 130, p. 12156-12162, Aug. 19, 2008).*
Marion et al. ("AuI-catalyzed cycloisomerization of 1,5-enynes bearing a propargylic acetate: formation of unexpected bicyclo[3.1.0]hexene." Chem. Comm., p. 2048-2050, Apr. 13, 2006).*

\* cited by examiner

*Primary Examiner* — Mark Kopec
*Assistant Examiner* — Tri V Nguyen
(74) *Attorney, Agent, or Firm* — Cantor Colburn LLP

(57) ABSTRACT

Disclosed herein is a method for synthesizing a nanoparticle using a carbene derivative. More specifically, provided is a method for synthesizing a nanoparticle by adding one or more precursors to an organic solvent to grow a crystal, wherein a specific carbene derivative is used as the precursor.

13 Claims, 14 Drawing Sheets

50nm

50nm

50nm

METHOD FOR PREPARING NANOPARTICLES USING CARBENE DERIVATIVES

This non-provisional application claims priority under 35 U.S.C. §119 to Korean Patent Application No. 10-2008-0046735, filed on May 20, 2008 in the Korean Intellectual Property Office (KIPO), the entire contents of which are incorporated herein by reference.

BACKGROUND

1. Field

This disclosure is directed to a method for preparing nanoparticles using carbene derivatives.

2. Description of the Related Art

Nanoparticles (also called "quantum dots") are defined as crystalline materials having a size of a few nanometers, and consist of several hundred to several thousand atoms. Since such small-sized nanoparticles have a large surface area per unit volume, most of the constituent atoms of the nanoparticles are present on the surface of the nanoparticles. Based on this characteristic structure, nanoparticles exhibit quantum confinement effects and shows electrical, magnetic, optical, chemical and mechanical properties different from those inherent to the constituent atoms of the nanoparticles. Accordingly, semiconductor crystalline nanoparticles have attracted much attention, because they can be applied to various devices, based on novel photoelectric properties such as the ability to control energy bandgaps through variation in size.

Vapor deposition processes, including metal organic chemical vapor deposition (MOCVD) and molecular beam epitaxy (MBE), have been used to prepare nanoparticles. Further, a wet chemistry technique wherein a precursor material is added to an organic solvent to grow nanoparticles has made remarkable progress. According to the wet chemistry technique, as a crystal is grown, a surfanctant is coordinated to the surface of the nanocrystal to control the crystal growth. Accordingly, the wet chemistry technique has an advantage in that the size, shape and uniformity of nanocrystals can be controlled in a relatively simple manner at low cost, compared to conventional vapor deposition processes, e.g., MOCVD and MBE (molecular beam epitaxy).

The characteristics of precursors used are known to be one factor required for controlling the size, shape, structure and uniformity of nanoparticles which are synthesized by controlling reaction mechanism or reaction rate. Precursors used to efficiently synthesize nanoparticles are limited to several types of materials.

Accordingly, research has been made on precursors capable of more efficiently controlling the size, shape, structure and uniformity of nanoparticles upon synthesis of the nanoparticles.

SUMMARY

Therefore, exemplary embodiments provide a method for preparing nanoparticles using precursors that can more efficiently control the size, shape, structure and uniformity of the nanoparticles.

Other exemplary embodiments provide nanoparticles having a uniform size, shape and structure.

Disclosed herein is a method for preparing nanoparticles including adding one or more precursors with one or more metal precursors to an organic solvent to grow a crystal, wherein carbene derivatives represented by the following Formula 1 or 2 is used as one of the precursor:

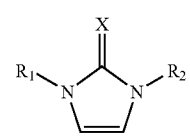

(1)

wherein X is O, S, Se, Te or Po;

$R_1$ and $R_2$ are each independently substituted or unsubstituted $C_5$-$C_{50}$ aryl, or substituted or unsubstituted $C_1$-$C_{50}$ alkyl; and substituents of $R_1$ and $R_2$, which are identical to or different from each other, are each independently $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl,

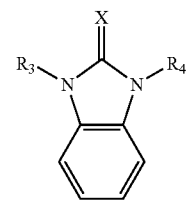

(2)

wherein X is O, S, Se, Te or Po;

$R_3$ and $R_4$ are each independently substituted or unsubstituted $C_5$-$C_{50}$ aryl, or substituted or unsubstituted $C_1$-$C_{50}$ alkyl; and substituents of $R_3$ and $R_4$, which are identical to or different from each other, are each independently $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl.

Further disclosed herein are nanoparticles prepared by the method.

The nanoparticles are selected from the group consisting of Group XII-XVI compounds, Group XIII-XVI compounds, Group XIV-XVI compounds and mixtures thereof. More specifically, the nanoparticles are selected from the group consisting of CdS, CdSe, CdTe, ZnS, ZnSe, ZnTe, HgS, HgSe, HgTe, PbS, PbSe, PbTe, AlS, AlSe, AlTe, GaS, GaSe, GaTe, InS, InSe, InTe, GeS, GeSe, GeTe, SnS, SnSe, SnTe, PbS, PbSe, PbTe and mixtures thereof.

The nanoparticles have a diameter of 3 to 50 nm, may be doped with a hetero-metal element and may have a core-shell or multi-layer structure.

BRIEF DESCRIPTION OF DRAWINGS

Exemplary embodiments will be more clearly understood from the following detailed description taken in conjunction with the accompanying drawings. FIGS. 1-15 represent non-limiting, exemplary embodiments as described herein.

FIG. 1 is NMR spectra of the carbene precursor prepared in Preparation Example 1;

FIG. 2 is a transmission electron micrograph (TEM) of nanoparticles obtained in Example 1;

FIG. 3 is a transmission electron micrograph (TEM) of nanoparticles obtained in Example 2;

FIG. 4 is a transmission electron micrograph (TEM) of nanoparticles obtained in Example 3;

FIG. 5 is a transmission electron micrograph (TEM) of nanoparticles obtained in Example 4;

FIG. 6 is a transmission electron micrograph (TEM) of the nanoparticle obtained in Example 5;

FIG. 7 is a transmission electron micrograph (TEM) of nanoparticles obtained in Example 6;

FIG. 8 is a transmission electron micrograph (TEM) of nanoparticles obtained in Example 7;

FIG. 9 is a transmission electron micrograph (TEM) of nanoparticles obtained in Example 8;

FIG. 11 is UV absorption spectra of nanoparticles obtained in Examples 9 and 10;

FIG. 12 is photoluminescence spectra of nanoparticles obtained in Examples 9 and 10;

FIG. 13 is photoluminescence spectra of nanoparticles obtained in Example 11 and Comparative Example 1;

FIG. 14 is a transmission electron micrograph (TEM) of nanoparticles obtained in Comparative Example 1.

DETAILED DESCRIPTION

Figure 1:
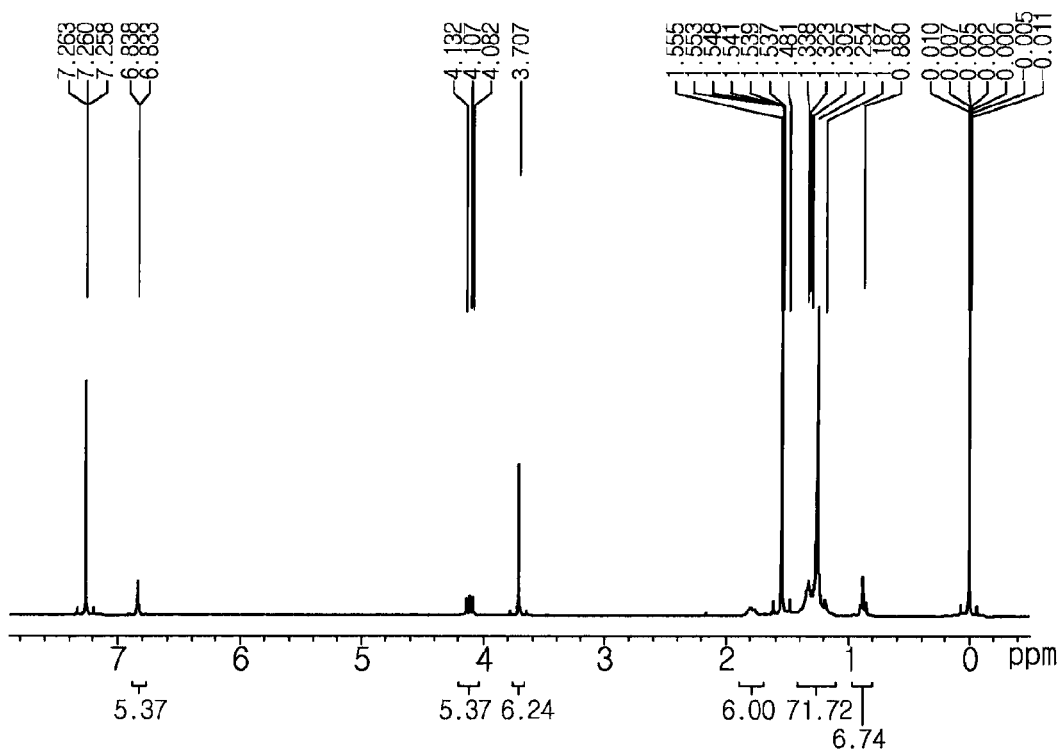

Hereinafter, a detailed description will be given of exemplary embodiments with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the drawings, the thickness of layers and regions are exaggerated for clarity.

According to exemplary embodiments, provided is a method for preparing nanoparticles including adding one or more precursors with one or more metal precursors to an organic solvent to grow a crystal, wherein carbene derivatives represented by the following Formula 1 or 2 are used as one of the precursor:

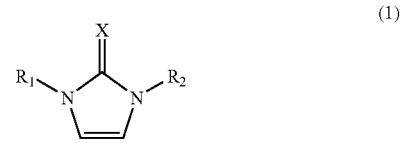

(1)

wherein X is O, S, Se, Te or Po;

$R_1$ and $R_2$ are each independently substituted or unsubstituted $C_5$-$C_{50}$ aryl, or substituted or unsubstituted $C_1$-$C_{50}$ alkyl; and substituents of $R_1$ and $R_2$, which are identical to or different from each other, are each independently $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl,

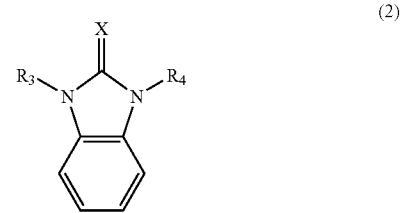

(2)

wherein X is O, S, Se, Te or Po;

$R_3$ and $R_4$ are each independently substituted or unsubstituted $C_5$-$C_{50}$ aryl, or substituted or unsubstituted $C_1$-$C_{50}$ alkyl; and substituents of $R_3$ and $R_4$, which are identical to or different from each other, are each independently $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl.

The carbene derivatives according to exemplary embodiments may have one or more substituents. The substituents may be identical to or different from each other, and specific examples thereof include, but are not limited to, $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, and $C_7$-$C_{30}$ heteroarylalkyl.

The alkyl may be straight-chained or branched, and specific examples thereof include methyl, ethyl, propyl, isobutyl, sec-butyl, tert-butyl, pentyl, iso-amyl and hexyl.

The term "cycloalkyl" as used herein refers to a $C_3$-$C_{20}$ monovalent monocyclic system. At least one hydrogen atom contained in the cycloalkyl group may be substituted.

The term "heterocycloalkyl" as used herein refers to a $C_5$-$C_{30}$ monovalent monocyclic system consisting of one, two or three heteroatoms selected from N, O, P and S atoms and the remaining ring carbon atoms. At least one hydrogen atom contained in the heterocycloalkyl group may be substituted.

Specific examples of the alkenyl include vinyl, allyl, propenyl, butenyl, hexenyl and cyclohexenyl.

The term "aryl" as used herein refers to a carbocyclic aromatic system including one or more aromatic rings in which the rings may be attached together in a pendent manner or may be fused. Specific examples of the aryl group include aromatic groups, such as phenyl, naphthyl, and tetrahydronaphthyl. At least one hydrogen atom contained in the aryl group may be substituted.

The term "heteroaryl" as used herein refers to a $C_5$-$C_{30}$ cyclic aromatic system consisting of one to three heteroatoms selected from N, Of P and S atoms and the remaining ring carbon atoms in which the rings may be attached together in a pendant manner or may be fused. At least one hydrogen atom contained in the heteroaryl group may be substituted.

The term "arylalkyl" as used herein refers to a group in which a part of hydrogen atoms contained in the aryl group defined above are substituted with lower alkyl radicals, such as methyl, ethyl and propyl. Examples of the arylalkyl group include benzyl and phenylethyl. At least one hydrogen atom contained in the arylalkyl group may be substituted.

The term "heteroarylalkyl" as used herein refers to a group in which a part of hydrogen atoms contained in the heteroaryl group defined above are substituted with lower alkyl radicals. At least one hydrogen atom included in the heteroarylalkyl group may be substituted with the same substituent as defined with respect to the "alkyl group". When the carbene derivatives have a steric barrier based on a long-chain alkyl group, it is more stable. $R_1$, $R_2$, $R_3$ and $R_4$ may be each independently $C_5$-$C_{30}$ aryl, or $C_1$-$C_{30}$ alkyl; and more $C_5$-$C_{18}$ aryl, or $C_1$-$C_{18}$ alkyl. Carbene derivatives with $C_6$-$C_{18}$ alkyl group may be used as precursor.

The carbene derivatives of Formula 1 or 2 according to exemplary embodiments may be represented by Formulae 3 to 26 below:

(3)

(4)

(5)

(6)

(7)

-continued (8)
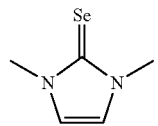

(9)
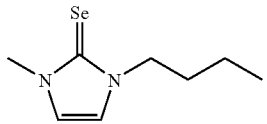

(10)
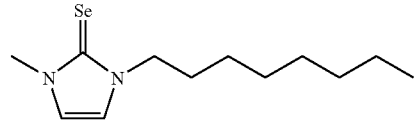

(11)
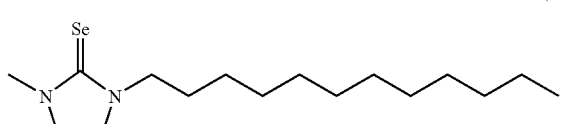

(12)
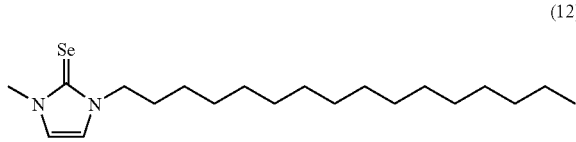

(13)
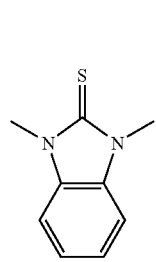

(14)

(15)

(16)

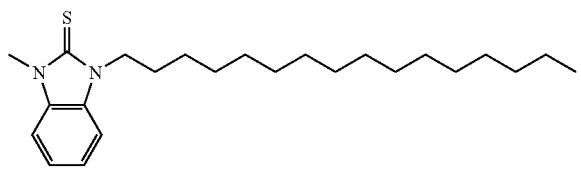
(17)

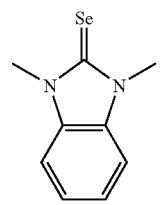
(18)

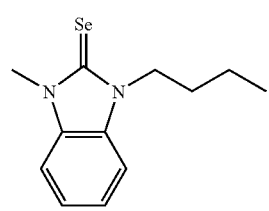
(19)

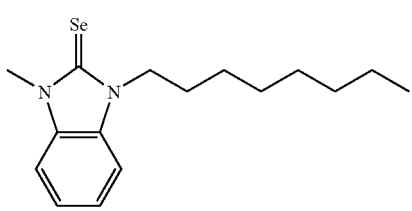
(20)

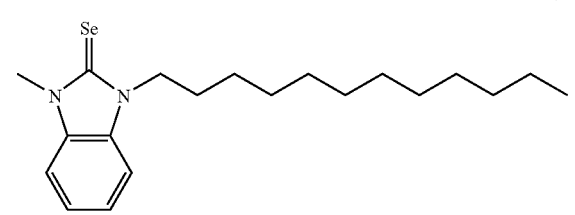
(21)

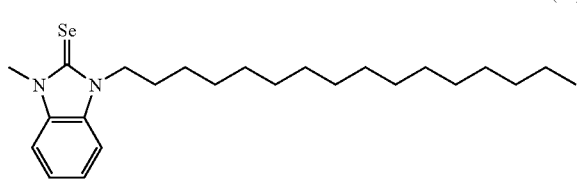
(22)

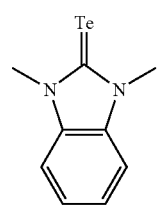
(23)

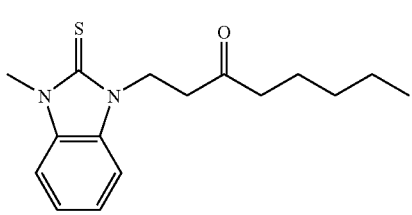
(24)

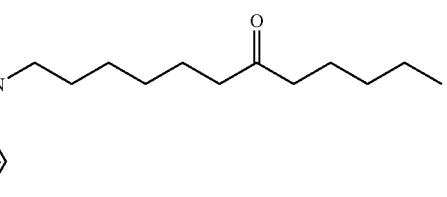
(25)

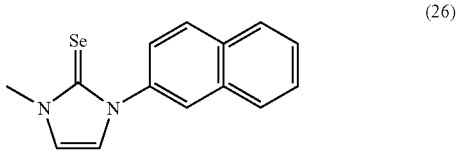
(26)

The carbene derivatives represented by Formula 1 or 2 have a strong bond between the Group XVI element and carbene. Accordingly, when the derivatives are used as a Group XVI element precursor in the nanoparticle wet synthesis process, it can retard the release rate of the Group XVI element, thus more favorably controlling the reaction rate. When trialkylsilyl or trialkylphosphine compounds, conventional Group XVI element precursors, are used, Group XVI elements are significantly rapidly released and nanoparticles having a size not less than a predetermined level are grown in a specific direction without maintaining their spherical shape. On the other hand, the use of the carbene derivatives according to the exemplary embodiments enables production of nanoparticles having a uniform size, shape and structure.

In the method for preparing nanoparticles according to exemplary embodiments, a reaction mixture is heated for a specific time to synthesize nanoparticles. Alternatively, the synthesis of the nanoparticles may be carried out by first preparing a primary reaction mixture containing the carbene compound, and after heating the primary reaction mixture, adding metal precursors thereto at a high temperature.

According to exemplary embodiments, the method for preparing nanoparticles may comprise i) mixing metal precursors, carbene derivatives of Formula 1 or 2 and an organic solvent with one another to prepare a reaction mixture; and ii) heating the reaction mixture.

In step ii), the heating temperature may be about 250° C. to about 320° C. When the heating temperature is about 300° C., spherical nanoparticles can be more efficiently obtained. The reaction mixture may further comprise a surfactant.

According to other embodiments, a method for preparing nanoparticles may comprise i) mixing the carbene derivatives of Formula 1 or 2 with an organic solvent to prepare a primary reaction mixture; and ii) hot-injecting metal precursors to the heated primary reaction mixture, followed by mixing. In step i), the heating temperature is preferably about 250° C. to about 320° C. In step ii), the metal precursors are sequentially hot-injected to the heated primary reaction mixture at the same temperature as the heating temperature of the primary reaction mixture, and after hot-injection, the temperature of the reaction mixture may maintained or elevated. At this time, the temperature is preferably maintained in the range of about 250° C. to about 320° C. The reaction time of step ii) is not particularly limited, but may be about 5 to about 72 hours, more about 30 minutes to about 24 hours, and more about 1 hour to 2 hours are good. The metal precursors may be added together with a surfactant.

In the method for preparing nanoparticles, a reaction mixture additionally containing a dopant is used in the reaction, thereby preparing doped nanoparticles. Examples of dopants that can be used in the method include, but are not limited to: transition metals selected from scandium (Sc), titanium (Ti), vanadium (V), chromium (Cr), manganese (Mn), iron (Fe), cobalt (Co), nickel (Ni), copper (Cu) and zinc (Zn); precious metals selected from gold (Au), silver (Ag), platinum (Pt) and iridium (Ir); alkali metals selected from lithium (Li), sodium (Na), potassium (K), rubidium (Rb), cesium (Cs) and francium (Fr); and mixtures thereof.

When doped nanoparticles are prepared according to exemplary embodiments, the release rate of the Group XVI element can be retarded, as compared to conventional metal precursors, due to the strong bond between the Group XVI element and the carbene compound, thus enabling the nanoparticles to be uniformly doped with the dopant.

Examples of metal precursors that can be used to provide an element other than the Group XVI element in the preparing method of nanoparticles include, but are not limited to, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium acetate, indium nitrate, and indium sulfate.

In the preparing method of nanoparticles according to exemplary embodiments, an organic solvent or a surfactant may be used for the reaction mixture. This material enables easy dispersion, thus yielding uniform nanoparticles. The organic solvent that can be used for the method according to exemplary embodiments is selected from the group consisting of, but not limited to: $C_{6-24}$ primary alkyl amines, $C_{6-24}$ secondary alkyl amines and $C_{6-24}$ tertiary alkyl amines; $C_{6-24}$ primary alcohols, $C_{6-24}$ secondary alcohols and $C_{6-24}$ tertiary alcohols; $C_{6-24}$ ketones and $C_{6-24}$ esters; $C_{6-24}$ heterocyclic compounds containing 1-3 nitrogen or sulfur; $C_{6-24}$ alkanes, $C_{6-24}$ alkenes and $C_{6-24}$ alkynes; and trioctylamine, trioctylphosphine and trioctylphosphine oxide.

Examples of surfactants that can be used for the method according to exemplary embodiments include $C_6$-$C_{24}$ alkanes and alkenes having a terminal carboxyl (COOH) group; $C_6$-$C_{24}$ alkanes and alkenes having a terminal phosphoryl (POOH) group; $C_6$-$C_{24}$ alkanes and alkenes having a terminal sulfinic acid (SOOH) group; and $C_6$-$C_{24}$ alkanes and alkenes having a terminal amino ($NH_2$) group.

Specific examples of surfactants include, but are not limited to, oleic acid, stearic acid, palmitic acid, hexylphosphonic acid, n-octylphosphonic acid, tetradecylphosphonic acid, octadecylphosphonic acid, n-octyl amine and hexadecyl amine.

The method for preparing nanoparticles may be used to prepare nanoparticles having a multi-layer structure comprising two or more layers. At this time, the preparing method of nanoparticles may be used for the formation of one or more layers. For example, in the case of core-shell structure nanoparticles, core or shell nanoparticles can be formed using the method according to exemplary embodiments. In the case of tri-layer structure nanoparticles, an intermediate layer or the outermost layer may be formed using the method. In particular, in order to form the intermediate layer of multi-layer structure nanoparticles, reactivity must be retarded. Accordingly, nanoparticles can be efficiently prepared using the method of exemplary embodiments.

According to other exemplary embodiments, provided are nanoparticles prepared by the method.

The nanoparticles are selected from the group consisting of Group XII-XVI compounds, Group XIII-XVI compounds, Group XIV-XVI compounds and mixtures thereof. The nanoparticles may comprise CdS, CdSe, CdTe, ZnS, ZnSe, ZnTe, HgS, HgSe, HgTe, PbS, PbSe, PbTe, AlS, AlSe, AlTe, GaS, GaSe, GaTe, InS, InSe, InTe, GeS, GeSe, GeTe, SnS, SnSe, SnTe, PbS, PbSe, PbTe and mixtures thereof.

Preferably, the nanoparticles may have a diameter of about 3 to about 50 nm and take a spherical shape, but the exemplary embodiments are not limited thereto. The nanoparticles may be doped with a hetero-metal element. In addition, the nanoparticles may be a core-shell structured nanocrystal consisting of a core and an over-coating that surrounds the core, or a core-containing multi-layer nanocrystal.

The exemplary embodiments will now be described in further detail with reference to the following examples. These examples are for illustrative purposes only and are not intended to limit the scope of the present invention.

EXAMPLES

Preparation Example 1

Synthesis of Se Carbene Precursor

Hexadecylmethylimidazolium iodide (3 g, 6.91 mmol) and potassium carbonate ($K_2CO_3$, 4.77 g, 34.51 mmol) were added to 50 mL of methanol and were then refluxed. Selenium (1.64 g, 20.72 mmol) was added thereto and refluxed at ambient temperature for about 12 hours. The remaining $K_2CO_3$ and Se were removed using a glass filter, the methanol was removed using an evaporator, and then extracted with dichloromethane/sodium bicarbonate ($NaHCO_3$). The dichloromethane layer was dried over $MgSO_4$ and separated by column chromatography employing hexane/ether (4:1) as an eluent to yield 1-hexadecyl-3-methyl-4-imidazoline-2-selone. The NMR spectrum of this compound is shown in FIG. 1.

$^1$H NMR ($CDCl_3$, 300 MHz): δ 6.88 (brs, 2H), 4.10 (t, J=7.5 Hz, 2H), 3.71 (3H, s), 1.80 (q, J=7.2 Hz, 2H), 1.25 (m, 28H), 0.88 (t, J=6.9 Hz, 3H) ppm.

Example 1

Synthesis of ZnSe Nanoparticles 50 mg of zinc acetate, 1 mL of oleic acid, 7 mL of octadecene (hereinafter, referred to as an "ODE") and 1.05 g of the 1-hexadecyl-3-methyl-4-imidazoline-2-selone prepared in Preparation Example 1 were charged in a round bottom flask equipped with a reflux condenser and the reaction temperature was adjusted to about 300° C. with stirring.

Figure 2:
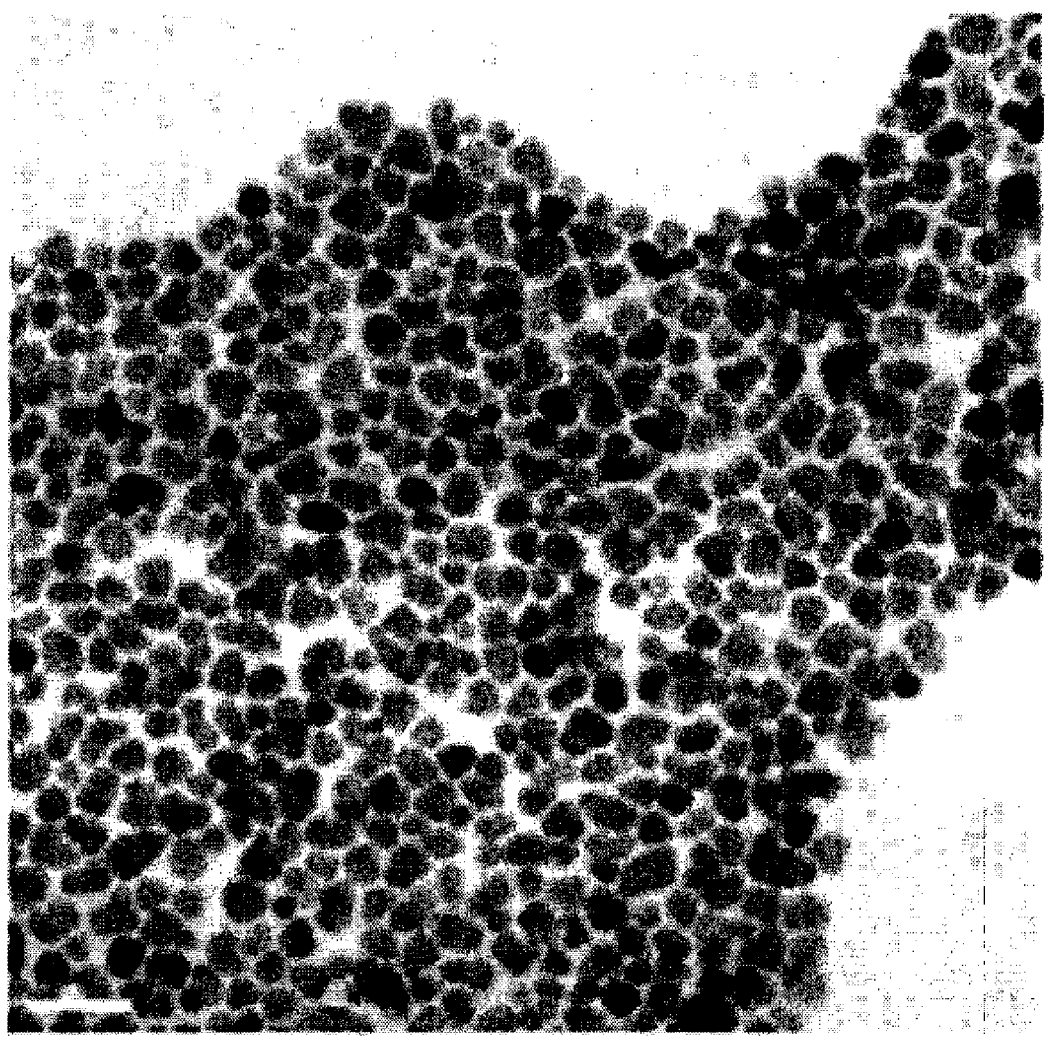

After completion of the reaction, the reaction mixture was cooled to ambient temperature as rapidly as possible, ethanol as a non-solvent was added thereto and the resulting mixture was subjected to centrifugation. The supernatant of the solution was decanted and discarded, leaving the centrifuged precipitate. The resulting precipitate was dispersed in toluene to prepare a dispersion solution of ZnSe nanocrystals (about 50 mg). The diameter of nanoparticles thus synthesized was 16.9 nm. The transmission electron micrograph (TEM) of the nanoparticles was obtained and shown in FIG. 2. As can be seen from FIG. 2, the synthesized nanoparticles have a uniform spherical shape.

Example 2

Synthesis of ZnSe Nanoparticles 1.05 g of the 1-hexadecyl-3-methyl-4-imidazoline-2-selone synthesized in Preparation Example 1 was dissolved in 7 mL of ODE, the solution was heated to about 270° C., a solution of 50 mg of zinc acetate dissolved in 1 mL of oleic acid was rapidly added thereto and allowed to react for one hour.

Figure 3:
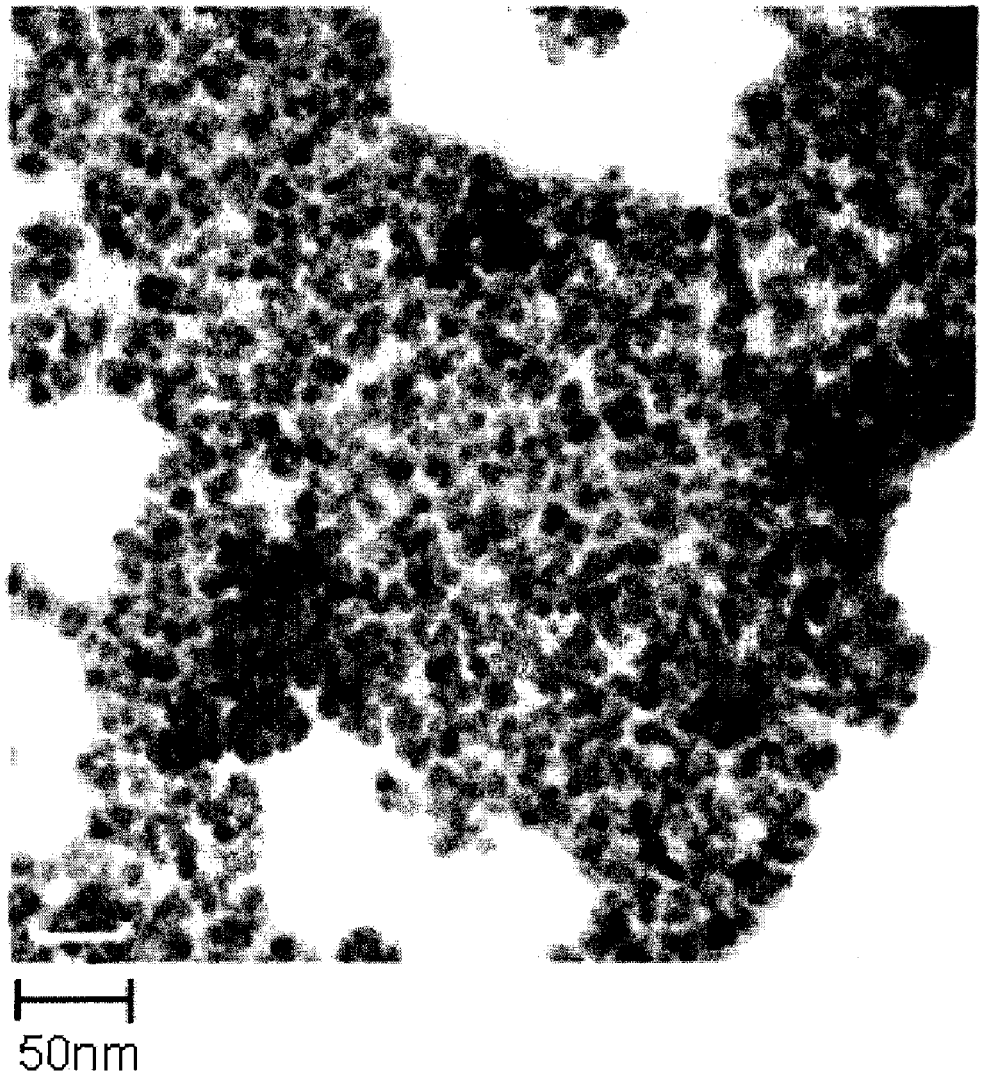
Figure 4:
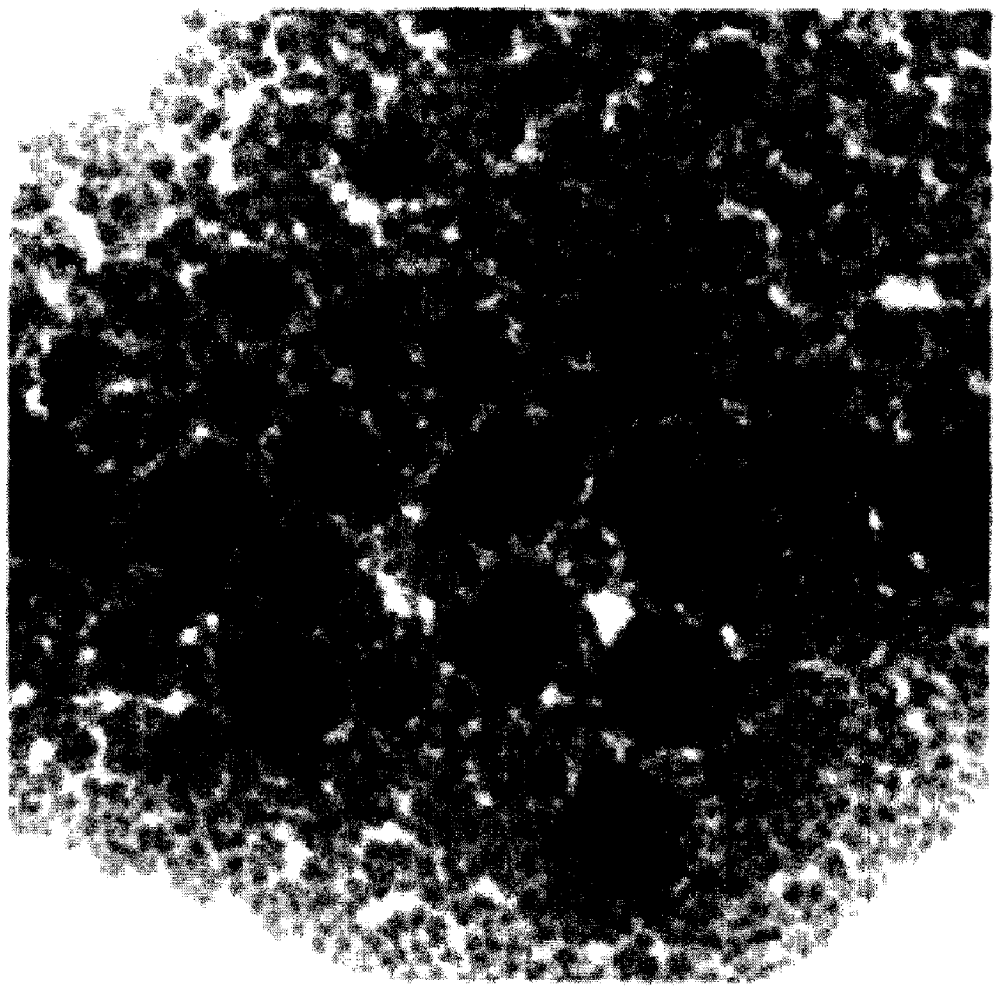
Figure 5:
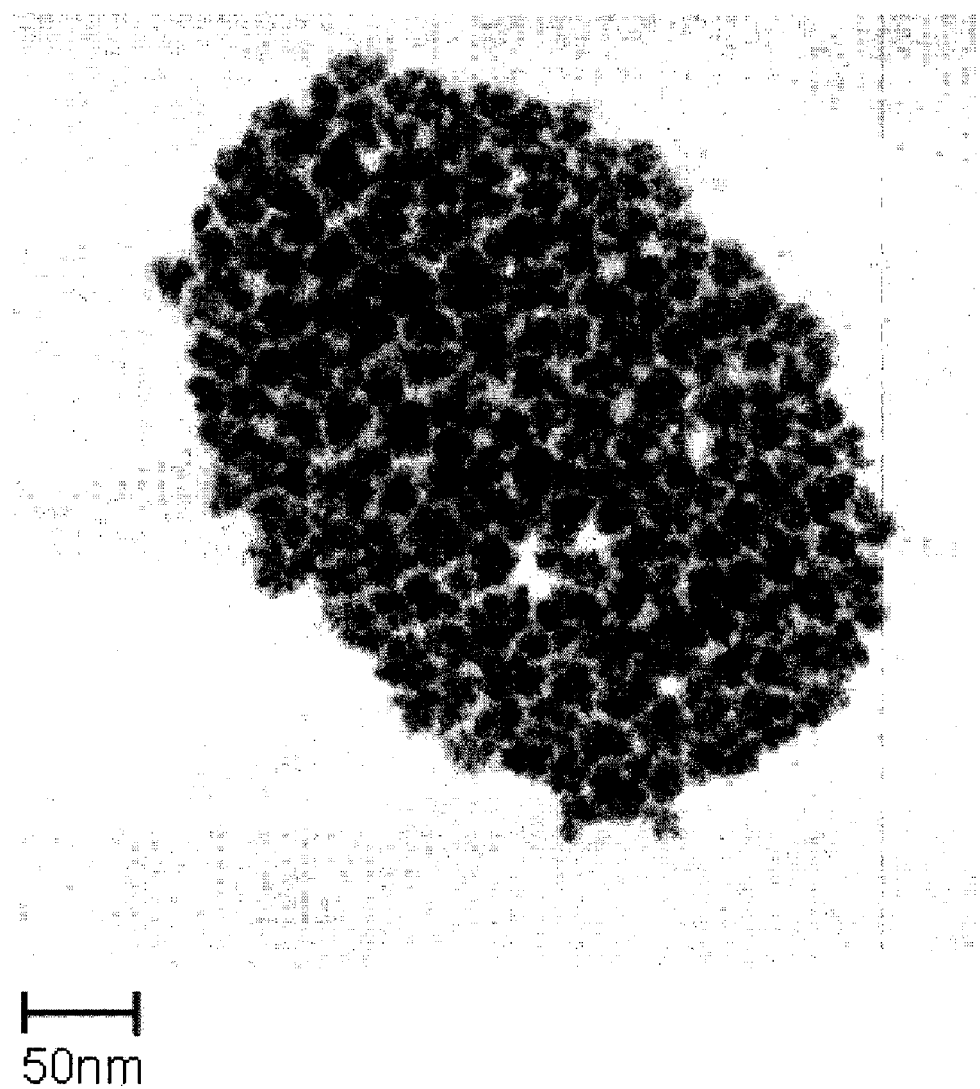
Figure 6:
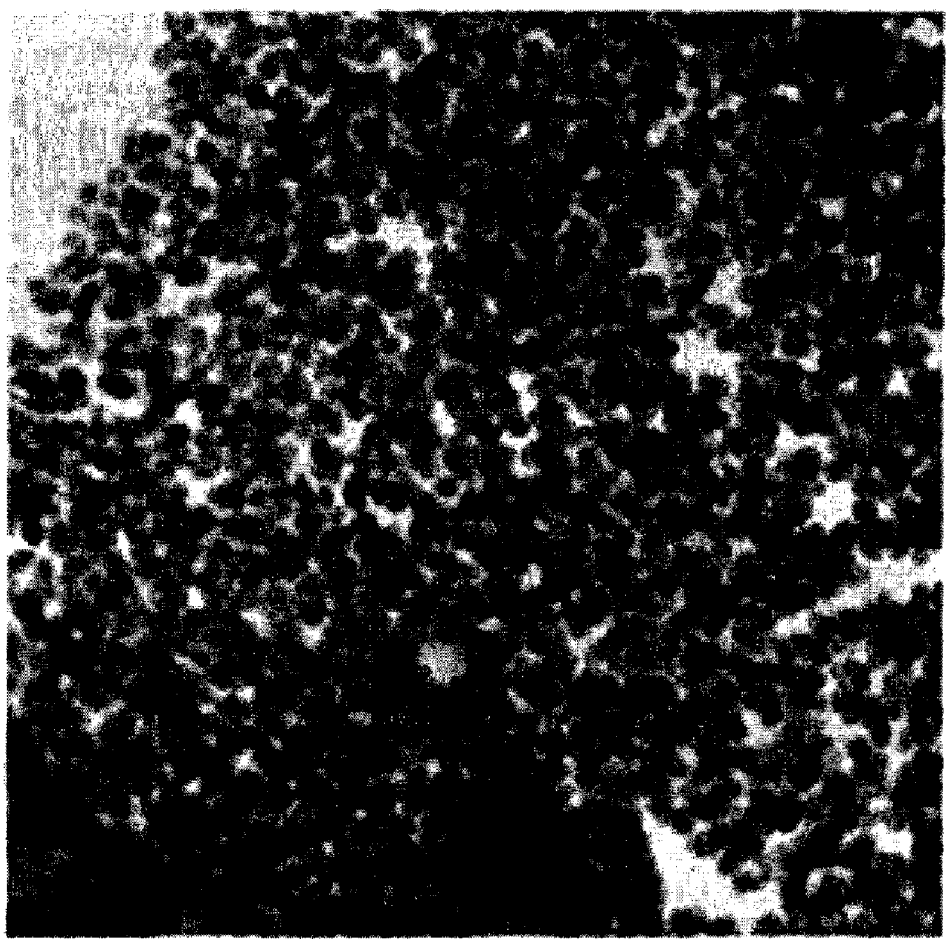
Figure 7:
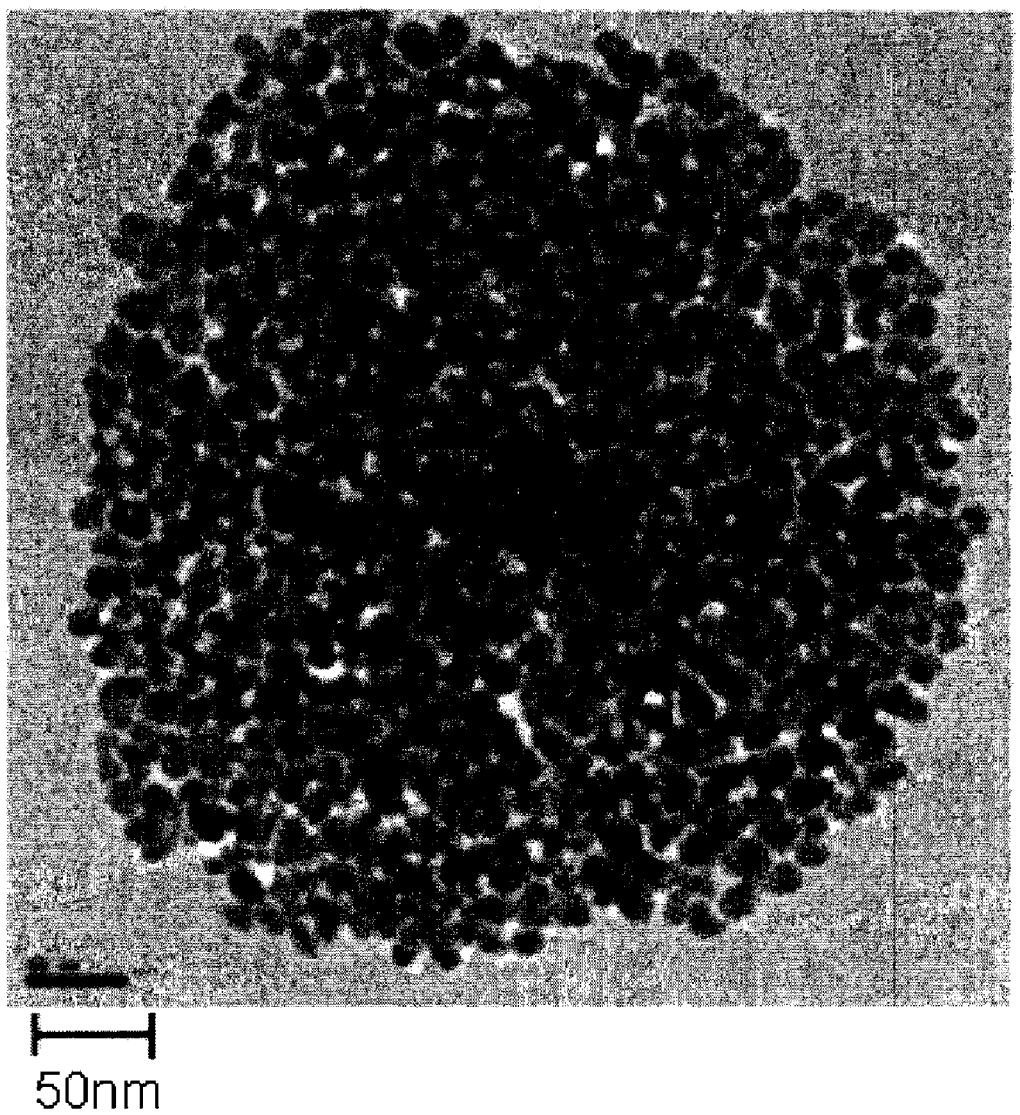
Figure 8:
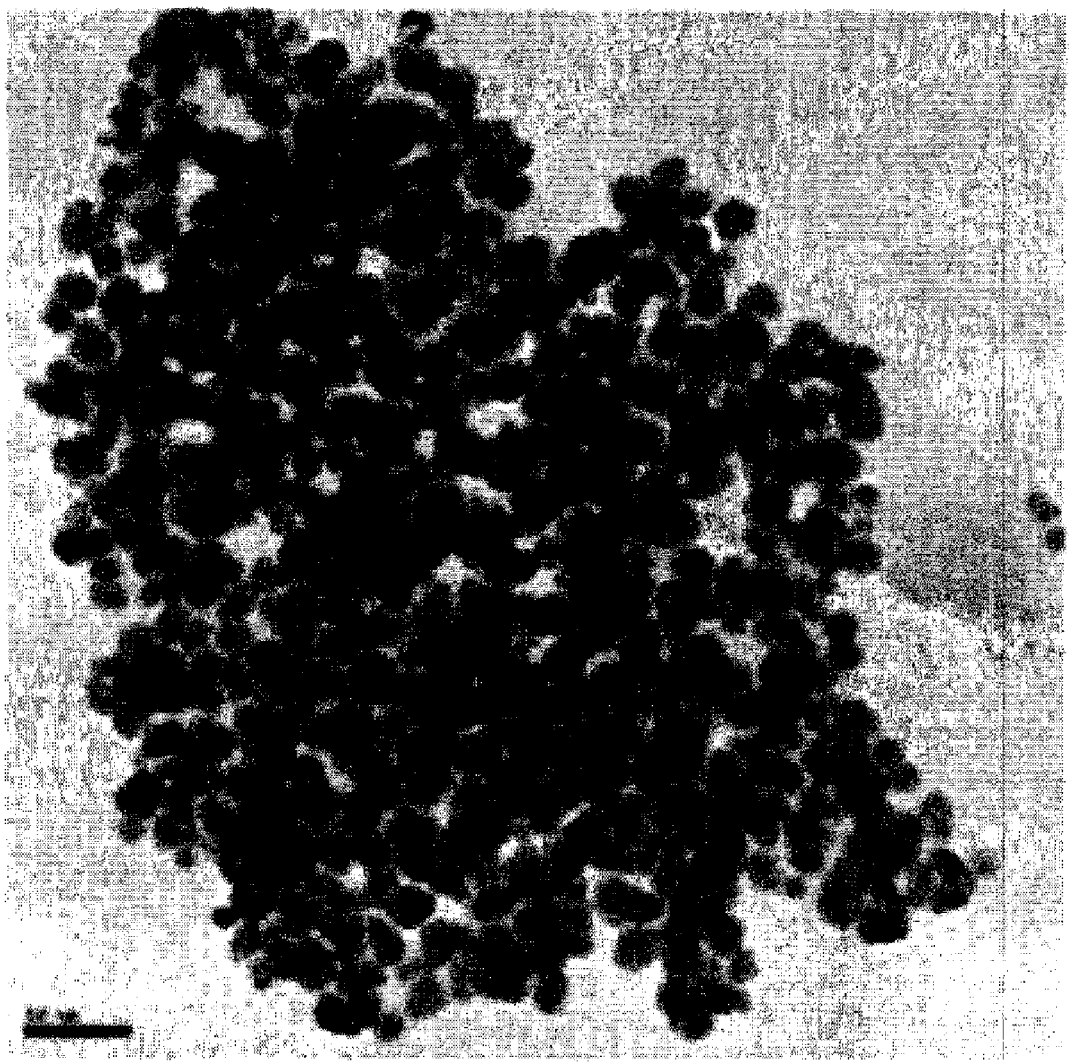

After the reaction was completed, the reaction mixture was cooled to ambient temperature as rapidly as possible, ethanol as a non-solvent was added thereto, and the resulting mixture was centrifuged. The supernatant of the solution was decanted and discarded, leaving the centrifuged precipitate. The obtained precipitate was dispersed in toluene to prepare a dispersion solution of ZnSe nanocrystals (about 50 mg). Nanoparticles thus synthesized had a diameter of 12.1 nm. The transmission electron micrograph (TEM) of the nanoparticles was obtained and is shown in FIG. 3.

Examples 3-7

Synthesis of ZnSe Nanoparticles

ZnSe nanoparticles were synthesized in the same manner as in Example 2 except that heating temperatures were about 250° C., about 260° C., about 280° C., about 290° C. and about 300° C., respectively. The transmission electron micrographs (TEMs) of the nanoparticles thus synthesized were obtained and are shown in FIGS. 4 to 8. Nanoparticles thus synthesized had respective diameters of about 5.4 nm, about 7.3 nm, about 13.6 nm, about 17.8 nm and about 22.1 nm.

Example 8

Synthesis of Mn-doped ZnSe Nanoparticles

Octadecene was heated in a 50 mL two neck schlenk flask under vacuum at about 120° C. for 3 hours or more to prepare 7 ml of water-free octadecene. 25 mg of anhydrous zinc acetate and 24 mg of manganese acetate were dissolved in 1 ml of oleic acid and the solution was placed in the flask. Then, 1.05 g of the 1-hexadecyl-3-methyl-4-imidazoline-2-selone synthesized in Preparation Example 1 was added to the flask and then dissolved. The flask was slowly heated to about 300° C. and the reaction was allowed to proceed for one hour.

Figure 9:
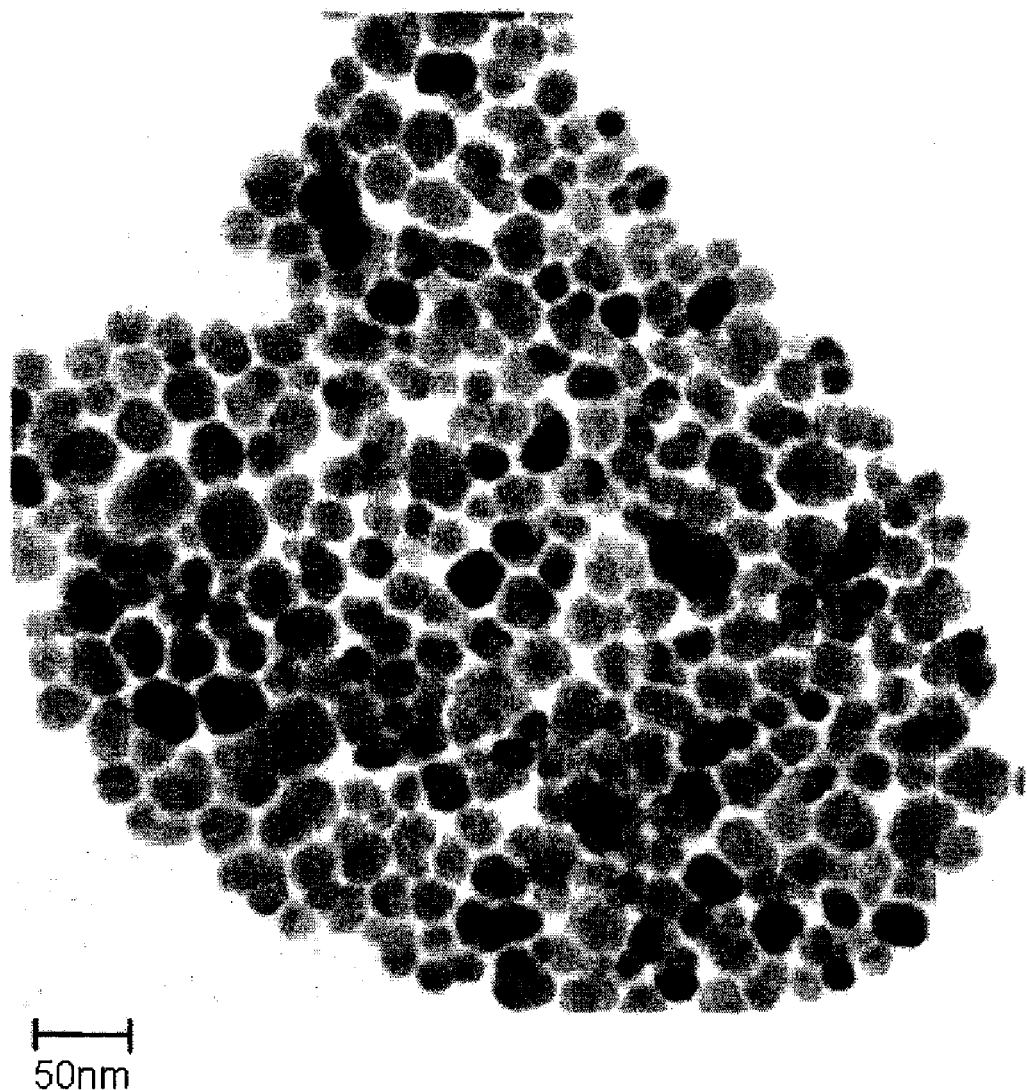
Figure 10A:
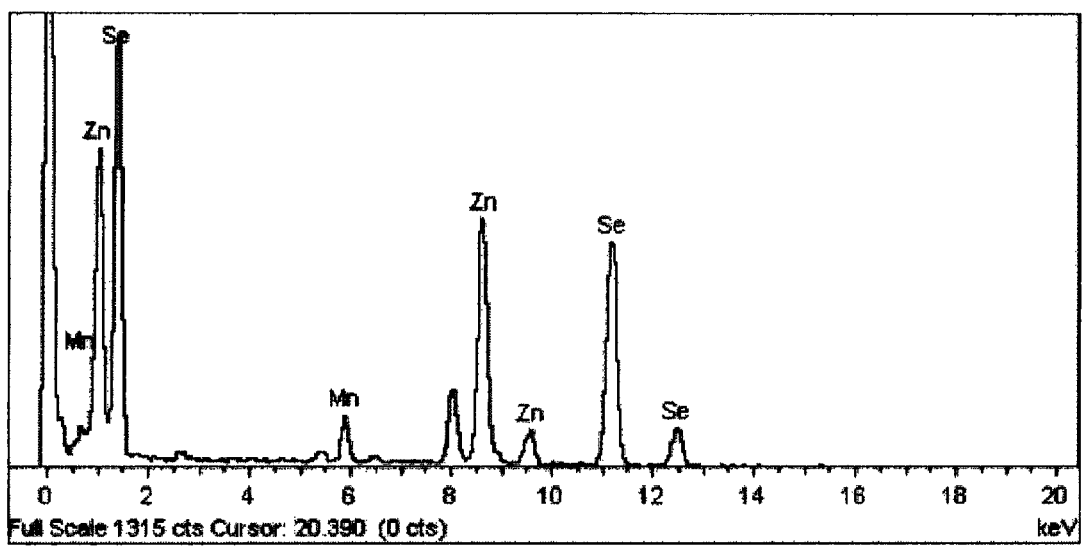
FIGS. 10A to 10C are graphs showing results of energy dispersive X-ray spectroscopy (EDX) of nanoparticles obtained in Example 8.
Figure 10B:
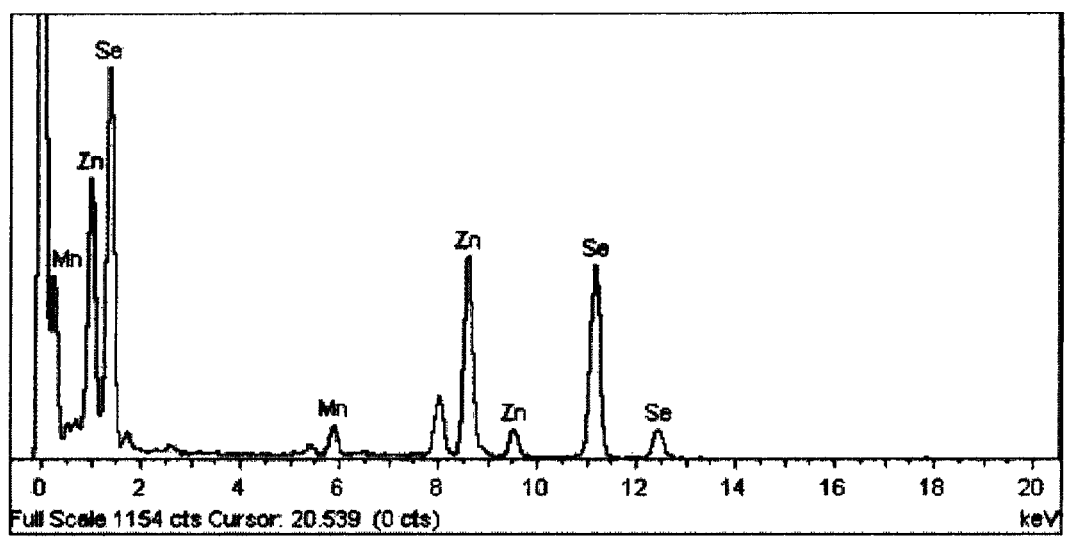
Figure 10C:
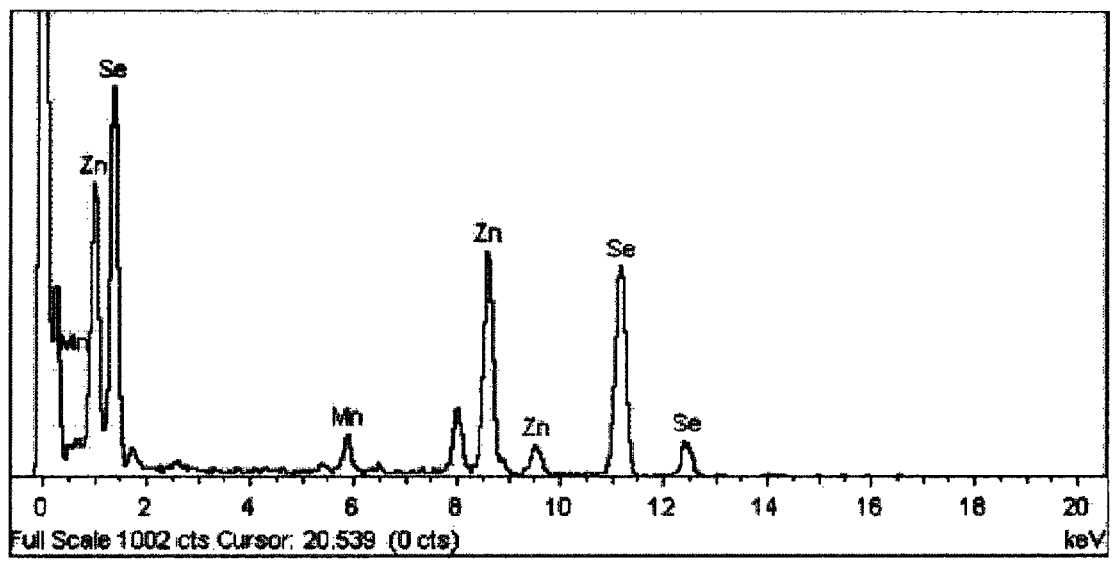

After completion of the reaction, the reaction mixture was cooled to ambient temperature as rapidly as possible, ethanol as a non-solvent was added thereto and the resulting mixture was subjected to centrifugation. The supernatant of the solution was decanted and discarded, leaving the centrifuged precipitate. The resulting precipitate was dispersed in toluene to prepare a dispersion solution of ZnSe nanocrystals (about 50 mg). Nanoparticles thus synthesized had a diameter of 20.8 nm. The transmission electron micrograph (TEM) of the nanoparticles was obtained and is shown in FIG. 9. In addition, results of energy dispersive X-ray spectroscopy (EDX) of the nanoparticles are shown in FIGS. 10A to 10C. As can be seen from FIGS. 10A to 10C, the composition of Mn is uniform according to location.

Example 9

Synthesis of InP/ZnSe Nanoparticles 0.058 g of indium acetate and 0.154 g of palmitic acid were mixed with 10 ml of octadecene in a reactor, and the mixture was heated to about 120° C. under vacuum, allowed to stand for one hour, and heated to about 280° C. with nitrogen purging. A solution previously prepared by mixing a solution (0.35 M, 285 µl) of trimethylsilyl phosphine in octadecene with 1 ml of trioctylphosphine was rapidly fed into the reactor at about 280° C. and allowed to react for one hour.

0.111 g of zinc acetate and 0.566 g of oleic acid were mixed with 6 ml of octadecene in another reactor and heated to 200° C. under nitrogen atmosphere to prepare a Zn solution. After the reaction was allowed to proceed at about 280° C. for one hour, the reaction mixture was cooled to about 200° C., and 6 ml of the prepared Zn solution was slowly added thereto at a rate of 2 ml/min and heated to about 300° C. A solution of 0.01592 g of the 1-hexadecyl-3-methyl-4-imidazoline-2-selone synthesized in Preparation Example 1 dissolved in 0.4 ml of octadecene was added thereto at about 300° C., and the reaction was allowed to proceed for about 30 minutes.

Figure 11:
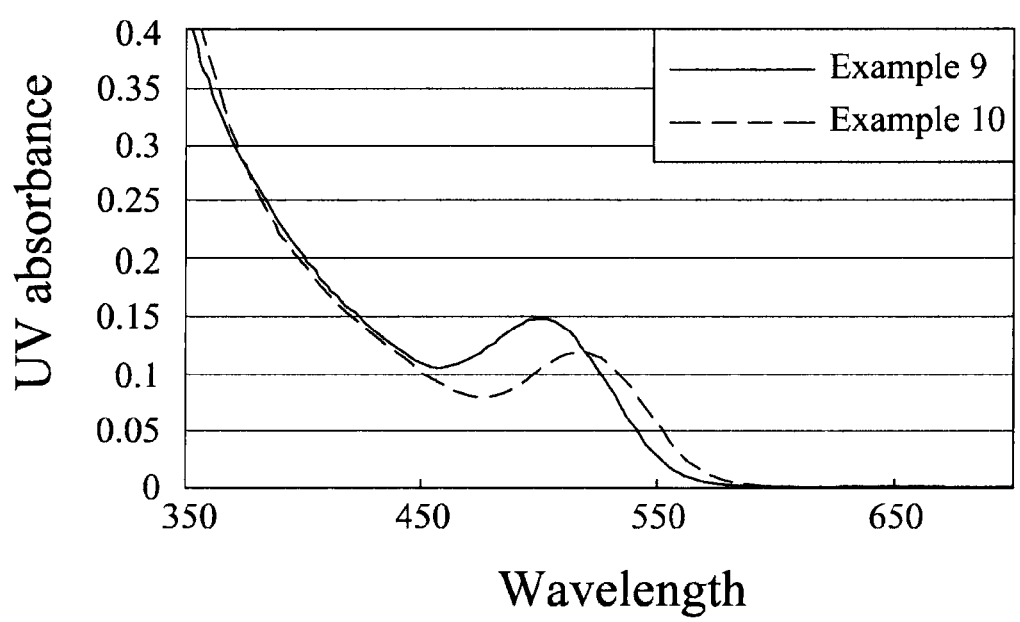
Figure 12:
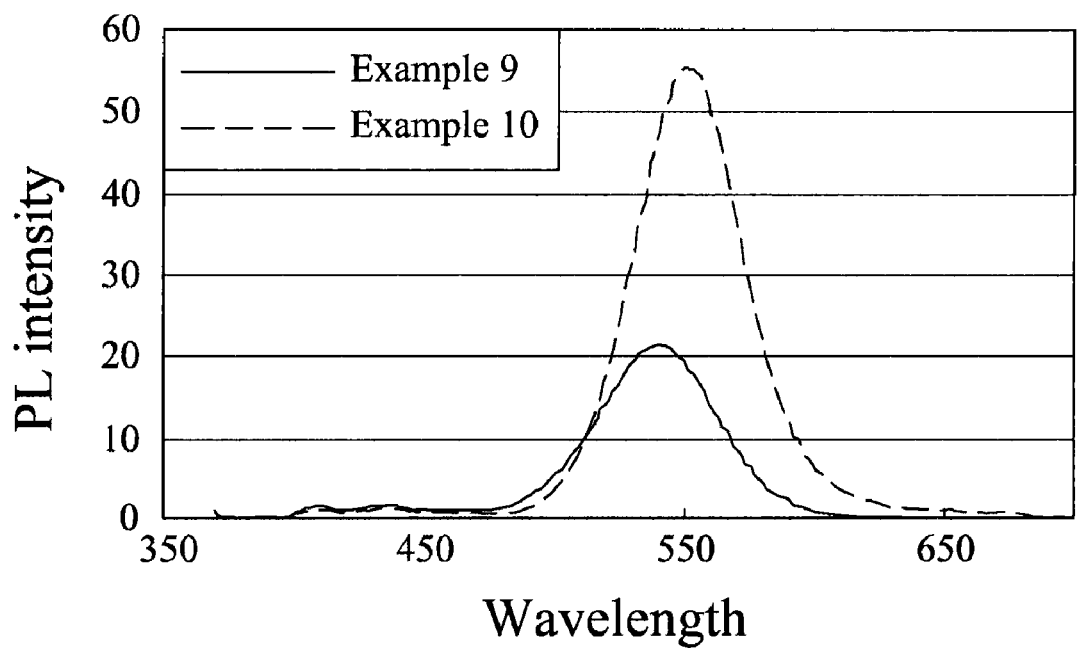

After the reaction was completed, the reaction mixture was cooled to ambient temperature as rapidly as possible, ethanol as a non-solvent was added thereto, and the resulting mixture was centrifuged. The supernatant of the solution was decanted and discarded, leaving the centrifuged precipitate. The obtained precipitate was dispersed in toluene to prepare InP/ZnSe nanoparticles. The UV absorption spectra and photoluminescence spectra of nanoparticles thus synthesized were obtained and are shown in FIGS. 11 and 12. The maximum emission wavelength of nanocrystals was 545 nm and emission efficiency was calculated as about 18%.

Example 10

Synthesis of InP/ZnSe/ZnS Nanoparticles 0.058 g of indium acetate and 0.154 g of palmitic acid were mixed with 10 ml of octadecene in a reactor and the mixture was heated to about 120° C. under vacuum, allowed to stand for one hour, and then heated to about 28° C. with nitrogen purging. A solution previously prepared by mixing a solution (0.35 M, 285 µl) of trimethylsilyl phosphine in octadecene with 1 ml of trioctylphosphine was rapidly fed into the reactor at about 280° C. and allowed to react for one hour.

0.111 g of zinc acetate and 0.566 g of oleic acid were mixed with 6 ml of octadecene in another reactor and heated to about 200° C. under a nitrogen atmosphere to prepare a Zn solution. After the reaction was allowed to proceed at about 280° C. for one hour, the reaction mixture was cooled to about 200° C., 6 ml of the prepared Zn solution was slowly added thereto at a rate of 2 ml/min and heated to about 300° C. A solution of 0.01592 g of the 1-hexadecyl-3-methyl-4-imidazoline-2-selone synthesized in Preparation Example 1 dissolved in octadecene 0.4 ml was added thereto at about 300° C. and the reaction was allowed to proceed for about 30 minutes. After addition of the 1-hexadecyl-3-methyl-4-imidazoline-2-selone was completed, a solution (0.4 M, 3 ml) of powdered sulfur in trioctylphosphine was slowly added to the reaction mixture at a rate of 1 ml/min.

After the reaction was completed, the reaction mixture was cooled to ambient temperature as rapidly as possible, ethanol as a non-solvent was added thereto, and the resulting mixture was centrifuged. The supernatant of the solution was decanted and discarded, leaving the centrifuged precipitate. The obtained precipitate was dispersed in toluene to prepare InP/ZnSe/ZnS nanoparticles. The UV absorption spectra and photoluminescence spectra of nanoparticles thus synthesized were obtained and are shown in FIGS. 11 and 12. The maximum emission wavelength was 554 nm and emission efficiency was calculated as about 46%.

Example 11

Synthesis of CdSe Nanoparticle 5 mL of trioctylamine (hereinafter, referred to as "TOA"), 0.45 g of oleic acid, and 0.0515 g of cadmium oxide were simultaneously charged in a 100 ml-flask equipped with a reflux condenser. The reaction temperature of the mixture was adjusted to about 300° C. with refluxing.

Separately, a solution (2 M, 0.05 ml), prepared by dissolving 0.0385 g of the 1-hexadecyl-3-methyl-4-imidazoline-2-selone synthesized in Preparation Example 1 in 10 ml of TOA, was mixed with 0.95 ml of TOA. The resulting solution was rapidly added to the reaction mixture under refluxing and the reaction was allowed to proceed for about 90 seconds.

Figure 13:
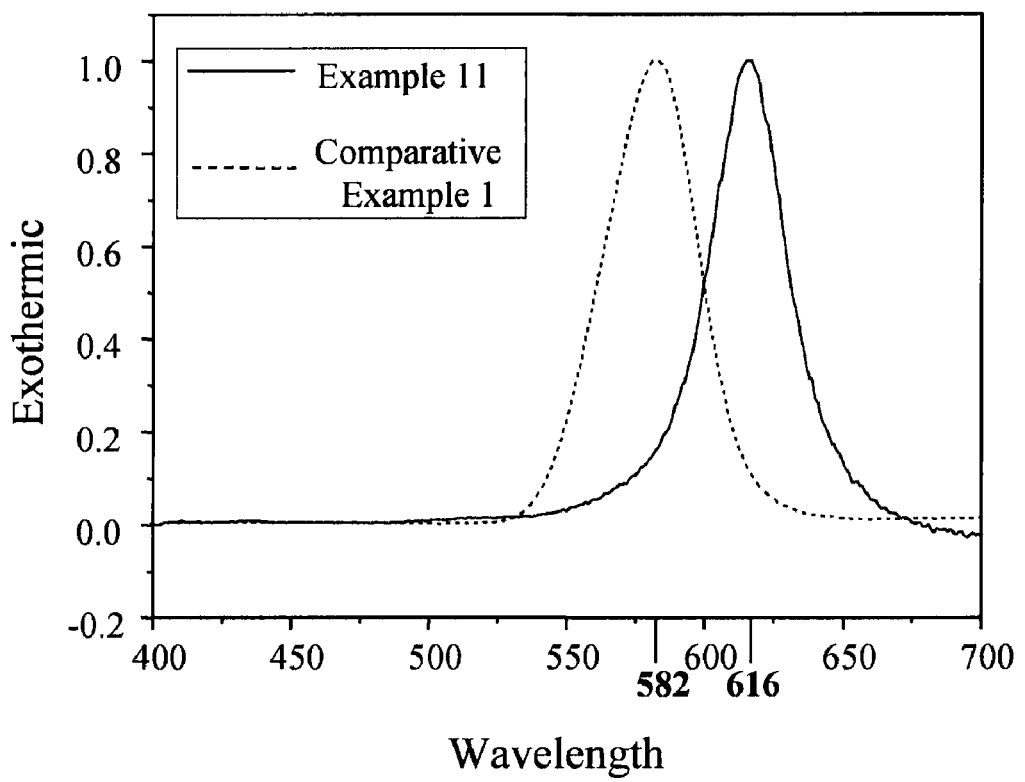

After the reaction was completed, the reaction mixture was cooled to ambient temperature as rapidly as possible, ethanol as a non-solvent was added thereto, and the resulting mixture was centrifuged. The supernatant of the solution was decanted and discarded, leaving the centrifuged precipitate. The obtained precipitate was dispersed in toluene to prepare a dispersion solution of CdSe nanocrystals (about 50 mg). The emission wavelength of the nanocrystals was 616 nm. The photoluminescence spectrum of nanocrystals thus synthesized was obtained and is shown in FIG. 13.

Comparative Example 1

Synthesis of CdSe Nanoparticles 5 mL of trioctylamine (hereinafter, referred to as "TOA"), 0.45 g of oleic acid and 0.0515 g of cadmium oxide were simultaneously placed in a 100 ml-flask equipped with a reflux condenser. The reaction temperature of the mixture was adjusted to about 300° C. with refluxing.

Separately, a selenium (Se) powder was dissolved in trioctylphosphine (referred to as a "TOP") to obtain a Se-TOP complex solution (Se concentration: ca. 0.2 M). 1 ml of the 0.2M Se-TOP complex solution was rapidly fed to the refluxing mixture and the reaction was allowed to proceed for about 90 seconds.

After the reaction was completed, the reaction mixture was cooled to ambient temperature as rapidly as possible, ethanol as a non-solvent was added thereto, and the resulting mixture was centrifuged. The supernatant of the solution was decanted and discarded, leaving the centrifuged precipitate. The obtained precipitate was dispersed in toluene to prepare a dispersion solution of CdSe nanocrystals (about 50 mg). The emission wavelength of the nanocrystals was about 582 nm. The photoluminescence spectrum of the nanocrystals thus synthesized was obtained and is shown in FIG. 13.

Comparative Example 2

Synthesis of Mn-doped ZnSe Nanoparticles

Figure 14:
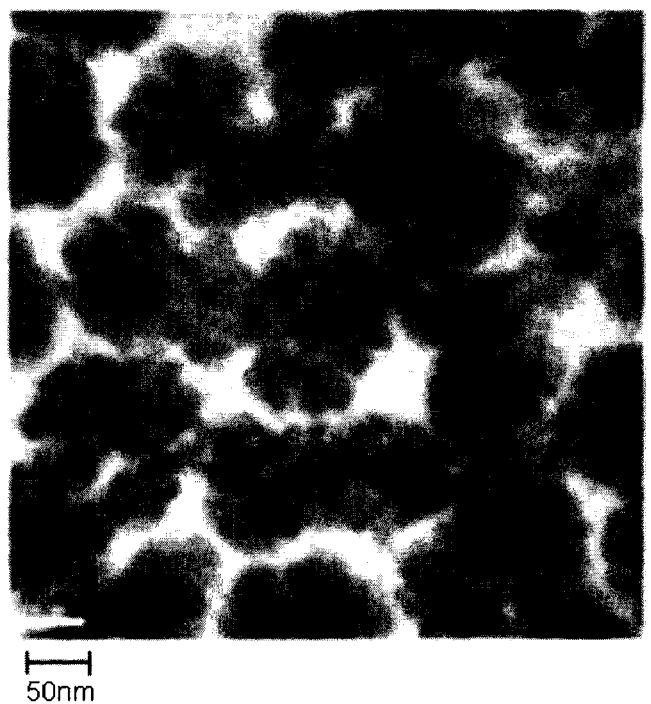

ZnSe nanocrystals were synthesized in the same manner as in Example 8 except that a 2.73 mol Se-TOP compound, prepared by dissolving a Se power in trioctylphosphine, was used instead of the 1-hexadecyl-3-methyl-4-imidazoline-2-selone synthesized in Preparation Example 1. A transmission electron micrograph (TEM) of the nanoparticles was obtained and is shown in FIG. 14. As can be seen from FIG. 14, about 10 nm nanoparticles are aggregated together to form 43 nm clusters and nanoparticles are non-uniform in size and shape.

Figure 15A:
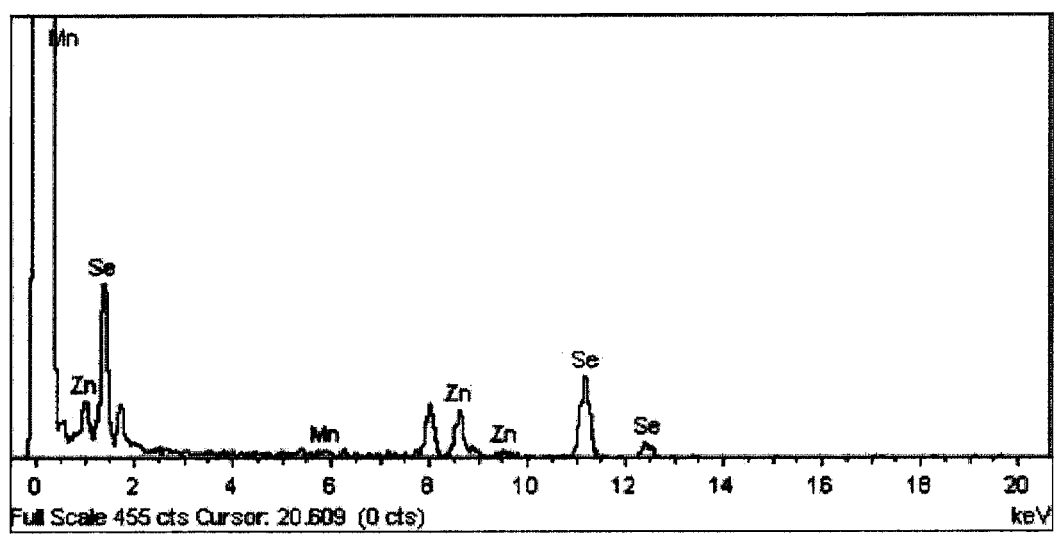
FIGS. 15A to 15C are graphs showing the results of energy dispersive X-ray spectroscopy (EDX) of nanoparticles obtained in Comparative Example 2.
Figure 15B:
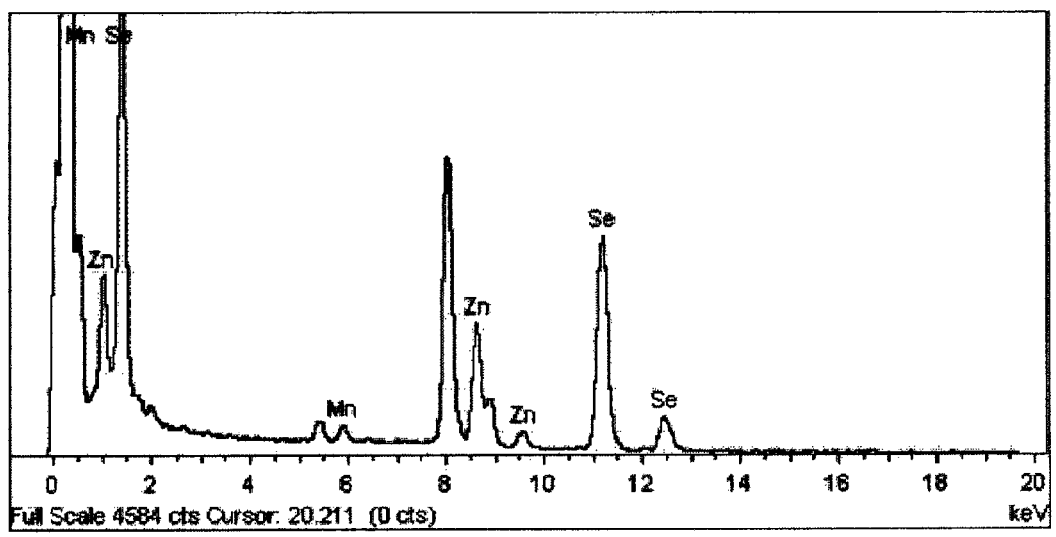
Figure 15C:
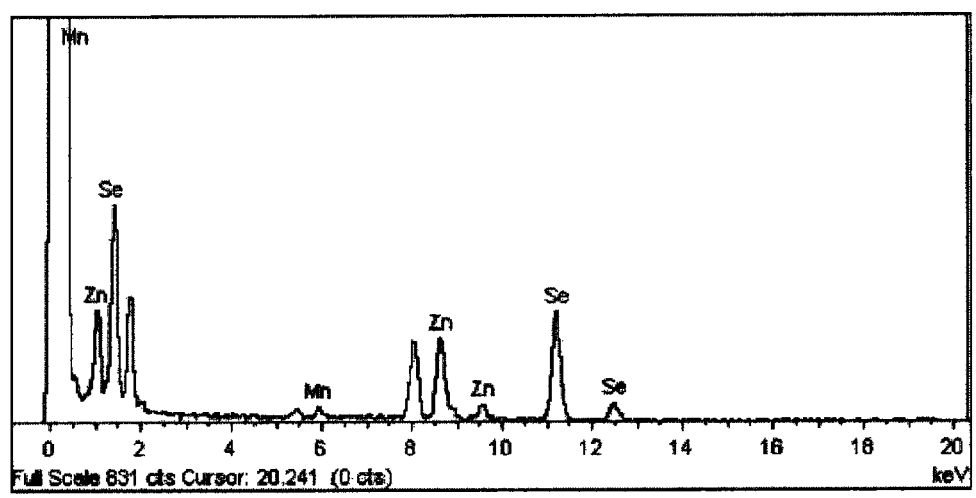

In addition, results of energy dispersive X-ray spectroscopy (EDX) of the nanoparticles are shown in FIGS. 15A to 15C. As can be seen from FIGS. 15A to 15C, the composition of Mn varies according to location.

The results obtained from Examples and Comparative Examples demonstrate that when the carbene compounds are used as the Group XVI element precursor according to the exemplary embodiments, the bonding force between the Group XVI element and the carbene compounds are stronger than the bonding force between a Group XVI element and a compound of a conventional precursor, thus lowering the release rate of the Group XVI element and more efficiently controlling the reaction rate. Accordingly, it can be confirmed that nanocrystals with a uniform spherical shape and a uniform size can be synthesized, and if doped, the dopant is uniformly doped in the nanocrystals.

Exemplary embodiments have been described in detail with reference to the foregoing preferred embodiments. However, exemplary embodiments are not limited to the preferred embodiments. Those skilled in the art will appreciate that various modifications and variations are possible, without departing from the scope and spirit of the appended claims.

What is claimed is:

1. A method for preparing nanoparticles comprising adding one or more precursors with one or more metal precursors, wherein the one or more metal precursors are selected from the group consisting of dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium acetate, indium nitrate, and indium sulfate to an organic solvent to grow a crystal, wherein the precursors are chosen from the group consisting of Formula 1:

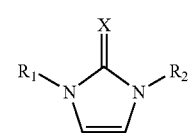

(1)

wherein X is O, S, Se, Te or Po;

$R_1$ and $R_2$ are each independently substituted or unsubstituted $C_5$-$C_{50}$ aryl, or substituted or unsubstituted $C_1$-$C_{50}$ alkyl; and substituents of $R_1$ and $R_2$, which are identical to or different from each other, are each independently chosen from the group consisting of $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl; and Formula 2

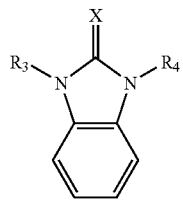

(2)

wherein X is O, S, Se, Te or Po;

$R_1$ and $R_2$ are each independently substituted or unsubstituted $C_5$-$C_{50}$ aryl, or substituted or unsubstituted $C_1$-$C_{50}$ alkyl; and Substituents of $R_3$ and $R_4$, which are identical to or different from each other, are each independently chosen from the group consisting of $C_1$-$C_{20}$ alkyl, $C_3$-$C_{20}$ cycloalkyl, $C_5$-$C_{30}$ heterocycloalkyl, $C_2$-$C_{20}$ alkenyl, $C_6$-$C_{20}$ aryl, $C_5$-$C_{30}$ heteroaryl, $C_7$-$C_{20}$ arylalkyl, $C_7$-$C_{30}$ heteroarylalkyl or carbonyl.

2. The method according to claim 1, wherein the precursor compounds are chosen from the group consisting of:

(3)

(4)

(5)

(6)

(7)

(8)

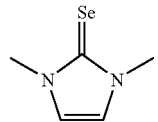

(9)

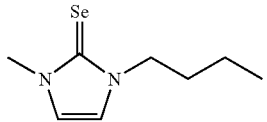

(10)

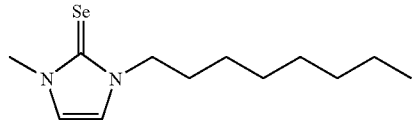

(11)

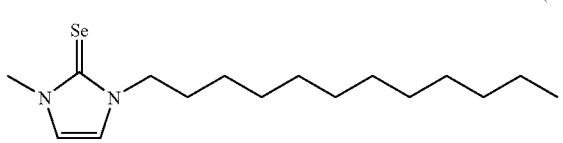

(12)

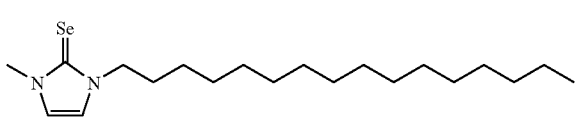

(13)

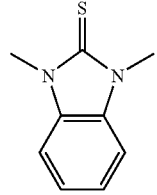

(14)

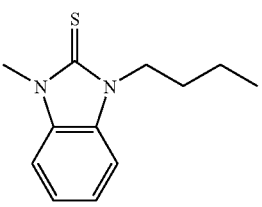

(15)

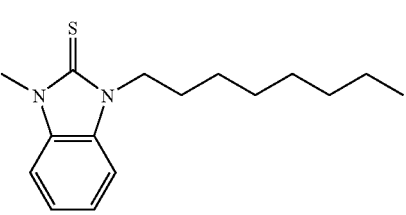

(16)

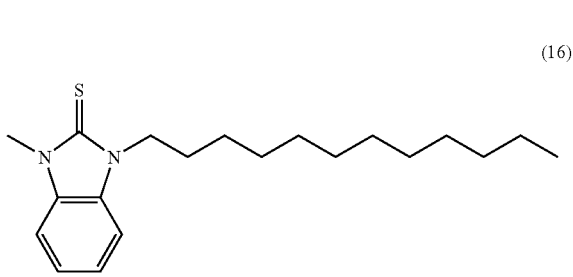

(17)
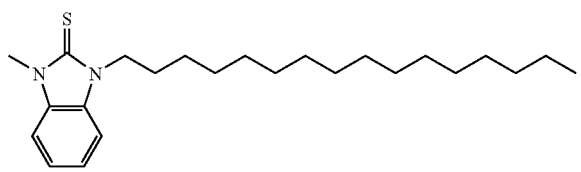

(18)
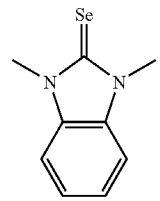

(19)
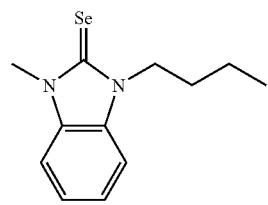

(20)
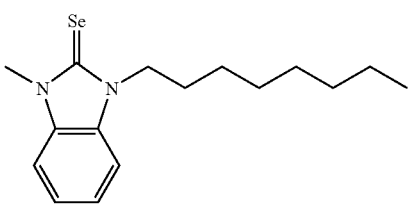

(21)
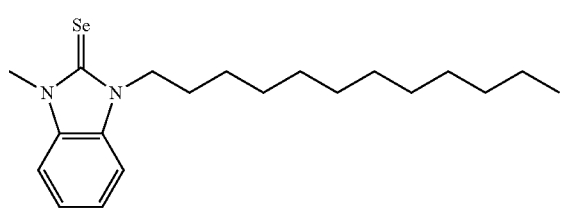

(22)
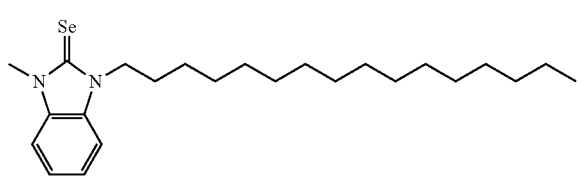

(23)
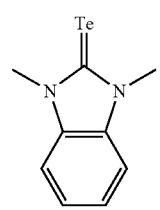

(24)
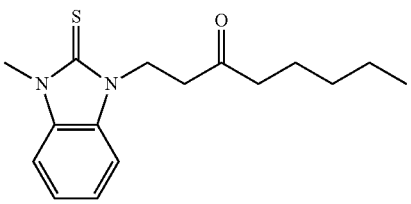

(25)
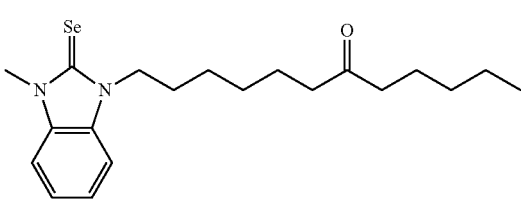

and

(26)
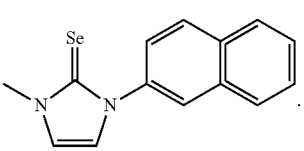

3. A method for preparing nanoparticles wherein the method comprises:
mixing metal precursors, precursor compounds according to claim 1 and an organic solvent with one another to prepare a reaction mixture; and
heating the reaction mixture.

4. The method according to claim 3, wherein in heating, the heating temperature is about 250° C. to about 320° C.

5. A method for preparing nanoparticles wherein the method comprises:
mixing the precursor compounds according to claim 1 with an organic solvent to prepare a primary reaction mixture; and
hot-injecting metal precursors to the heated primary reaction mixture, followed by mixing.

6. The method according to claim 5, wherein in mixing, the heating temperature is about 250° C. to about 320° C.

7. The method according to claim 5, wherein in hot-injecting, the metal precursor is hot-injected to the heated primary reaction mixture at the heating temperature of the primary reaction mixture, and after hot-injection, the temperature of the reaction mixture is maintained in the range of about 250° C. to about 320° C.

8. The method according to claim 5, wherein in heating, the reaction time is about 5 to about 72 hours.

9. The method according to claim 3, wherein the reaction mixture further comprises a dopant to prepare a doped nanoparticle.

10. The method according to claim 9, wherein the dopant is selected from the group consisting of transition metals including scandium (Sc), titanium (Ti), vanadium (V), chromium (Cr), manganese (Mn), iron (Fe), cobalt (Co), nickel (Ni), copper (Cu) and zinc (Zn); precious metals including gold (Au), silver (Ag), platinum (Pt) and iridium (Ir); alkali metals including lithium (Li), sodium (Na), potassium (K), rubidium (Rb), cesium (Cs) and francium (Fr); and mixtures thereof.

11. The method according to claim 1, wherein the organic solvent is selected from the group consisting of $C_{6-24}$ primary alkyl amines, $C_{6-24}$ secondary alkyl amines and $C_{6-24}$ tertiary alkyl amines; $C_{6-24}$ primary alcohols, $C_{6-24}$ secondary alcohols and $C_{6-24}$ tertiary alcohols; $C_{6-24}$ ketones and $C_{6-24}$ esters; $C_{6-24}$ heterocyclic compounds containing 1-3 nitrogen or sulfur atoms or a combination thereof; $C_{6-24}$ alkanes, $C_{6-24}$ alkenes and $C_{6-24}$ alkynes; and trioctylamine, trioctylphosphine and trioctylphosphine oxide.

12. The method according to claim 1, wherein a surfactant is further added to prepare the nanoparticle and the surfactant is selected from the group consisting of oleic acid, stearic acid, palmitic acid, hexylphosphonic acid, n-octylphosphonic acid, tetradecylphosphonic acid, octadecylphosphonic acid, n-octyl amine and hexadecyl amine.

13. The method according to claim 1, wherein the nanoparticle has a multi-layer structure comprising two or more layers and the method is used to form one or more layers.

* * * * *